May 2, 1944.  H. L. APFELBAUM  2,347,981
MOLDED HINGE
Filed March 27, 1942
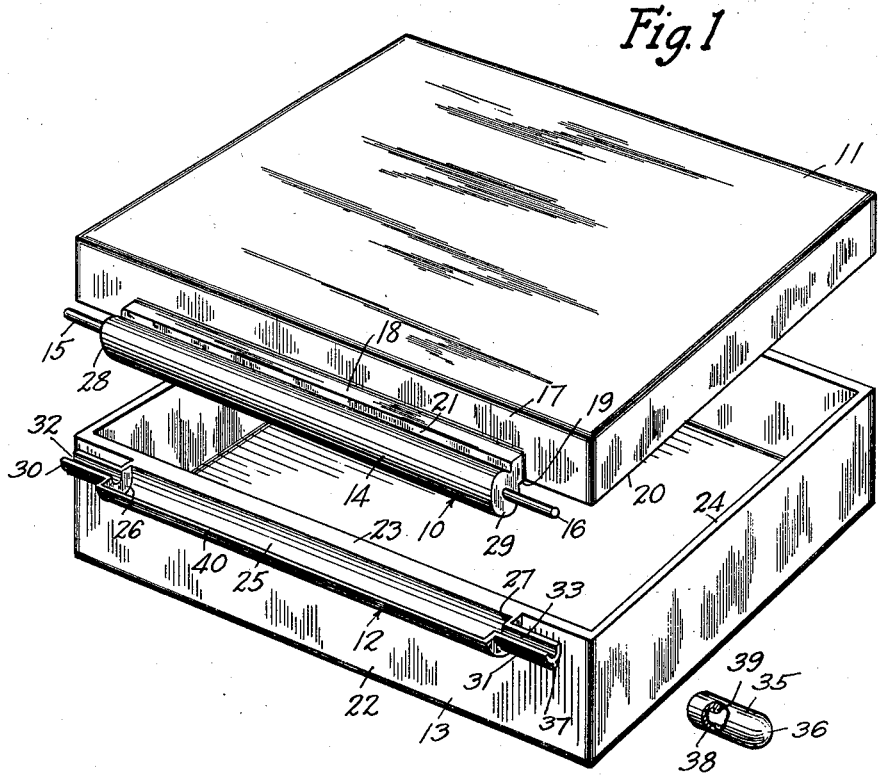
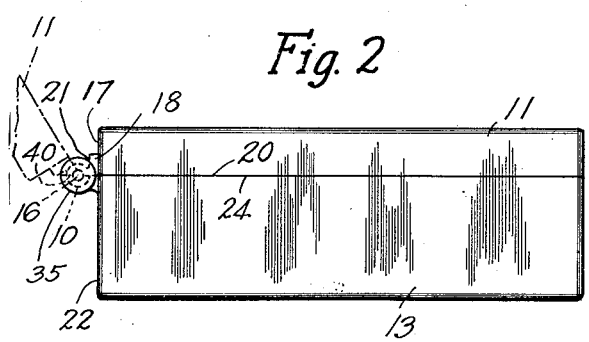
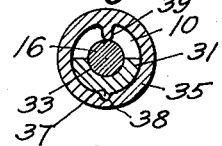
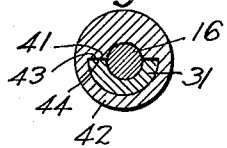
INVENTOR.
Huna L. Apfelbaum
BY
ATTORNEY.

Patented May 2, 1944

2,347,981

UNITED STATES PATENT OFFICE 2,347,981

MOLDED HINGE

Huna L. Apfelbaum, Brooklyn, N. Y., assignor to Victor Metal Products Corporation, Brooklyn, N. Y., a corporation of New York Application March 27, 1942, Serial No. 436,388

10 Claims. (Cl. 220—31)

This invention relates to molded hinged boxes and particularly to the molded hinge therefor.

While there has long been a demand for hinged boxes molded of suitable synthetic plastics, such boxes have not been extensively commercialized owing at least in part to the difficulties of providing them at a satisfactory cost with molded hinges molded integrally with the box parts. Owing to the rounded nature of the hinge parts, it has heretofore been thought that the molding of such parts would require undercuts in the molds thereby making it difficult if not impossible to produce integrally molded hinged molded boxes.

The present invention contemplates the provision of a hinge part which is molded integrally with and simultaneously with the molding of the top or cover part of a box, and a cooperating and interfitting part similarly molded on and with the container part of the box, the molded parts being shaped and adapted for convenient molding in ordinary molds, and for quick and easy assembly and being readily secured together for relative rotation by means of a simple inexpensive capping member in the form of a sleeve.

The invention further contemplates the provision of a three part molded hinge, the two main complementary parts of which are formed with and at the same time as the box parts and the remaining part of which is a securing part in the form of a capping tube or sleeve.

The invention further contemplates the provision of a pair of complementary hinge parts shaped to interfit for relative rotation and each adapted to be molded as a portion of a box part.

The various objects of the invention will be clear from the description which follows and from the drawing, in which, Fig. 1 is a perspective view of a molded box with the hinge integrally molded thereon and disassembled to show the parts, and with the capping member partly broken away to show its interior.

Fig. 2 is a side view of the box and of the hinge thereof assembled.

Fig. 3 is a vertical section of the end part of the assembled hinge.

Fig. 4 is a similar section of a modified form of the end portion of the hinge showing a modified form of the recessed hinge member and of the capping member.

In the practical embodiment of the invention shown by way of example, the cylindrical hinge member 10 which may be termed the male member is shown molded integrally with the box cover 11, while the recessed hinge member 12, which may be termed the female member is shown molded integrally with the container part 13 of the box.

The male hinge member 10 comprises the generally cylindrical central portion 14 terminating at each end in a coaxial end portion or pin as 15 or 16 preferably of reduced diameter. Preferably, though not necesarily, the pins are of the same length and diameter, the total length of the male hinge member including the central enlarged portion and the projecting end portions or pins being preferably about equal to or somewhat less than the length of the rear wall 17 of the box cover 11, the end portions 15 and 16 being in rearward spaced relation to said wall. Said male member is preferably joined integrally to said rear wall 17 by the connecting portion 18, being molded integrally and simultaneously with the molding of the cover. The lower surface 19 of said connecting portion 18 is preferably a continuation of the lower surface 20 of the cover, and the rear surface 21 thereof is preferably substantially upright and in position to engage the rear part of the female member 12 when the cover is completely open and thereby to serve as a stop for the cover as will be described more fully hereinafter. It will be understood that the connecting portion 18 need not be necessarily of any specific shape or size but that it may assume various shapes and sizes free of undercuts found convenient for the molding of the parts and the interrelated coaction thereof. It will also be understood that while the end portions 15 and 16 are shown and described as of reduced diameter, they may be of the same or even of greater diameter than that of the central portion 14 if found convenient or advisable.

The female member 12 of the hinge and particularly the outer surfaces thereof may also vary considerably in size and shape, the inner surfaces thereof being designed to fit and engage and to serve as a partial bearing for the outer surfaces of the male member and to allow rotation of the male member thereon. Said female member is therefore molded preferably in semi-cylindrical form and as a projection outstanding from the rear surface 22 of the container part 13 of the box. The top surface 23 of the member 12 is preferably coplanar and continuous with the upper edge 24 of the container part. In the central part of the female member, is made the recess 25, of semi-cylindrical form corresponding to and adapted to receive the under half of the central portion 14 of the male member. The inner surfaces of the end walls 26 and 27 of the recess 25 are adapted to engage the corresponding end walls 28 and 29 respectively of the cylindrical portion 14 and to prevent longitudinal movement of the portion 14 in the recess and thereby to align the box cover with the container part of the box and to prevent relative sidewise movement thereof.

Projecting respectively from the end walls 26 and 27 the hollow semi-cylindrical pin-receiving end projections 30 and 31, each of which has a semi-cylindrical recess therein. The pin 15 of the male member is adapted to fit snugly into the recess 32 while the pin 16 similarly fits into the recess 33 of the part 31, said recesses 32 and 33 being of the proper size to permit rotation of the respective pins therein. The recesses 25, 32 and 33 are all open at the top and are in coaxial alignment with each other so that when the male portion 14 is moved downwardly through the open top of and into the recess 25, the pins 15 and 16 fit snugly and rotatably in their respective recesses 32 and 33 in the parts 30 and 31.

In the closed position of the cover 11, the under edge 20 thereof and the edge 19 of the connecting part 18 rest on the upper edge 24 of the container part and the top edge 23 of the female member respectively, with the lower half of the portion 14 in the recess 25 and the lower halves of the projections 15 and 16 in the recesses of the parts 30 and 31. When the cover is opened, the part 14 merely rotates in the recess 25 and stays therein, while the pins 15 and 16 similarly rotate within and stay in the recesses 32 and 33 therefor, the male member being prevented by means soon to be described from lifting out of the female member during such rotation. Whether the end projections 32 and 33 are of the same diameter or smaller or larger in diameter than the central portion of the female member, said end projections nevertheless are arranged in rearward spaced relation to the rear surface 22 to provide a space therebetween for the insertion of part of the securing means.

Suitable means are provided to prevent lifting of the male member out of the female member or possible separation of the hinge parts. In the form shown in Figs. 1 and 3, said means takes the form of a sleeve-like cap 35, preferably closed at one end 36 and open at the other end, so that the part 31 may pass through the open end of and into the cap. The diameter of the inner surface of the cap 35 is substantially equal to the outer diameter of the part 31 to fit tightly and frictionally thereon. However, to insure additionally against relative rotation of the cap and the part 31, said part may be provided with a longitudinal rib 37 entering the corresponding longitudinal groove 38 in the inside surface of the cap.

It will be noted that since the part 31 is semi-cylindrical, it fills only half of the space on the inside of the cap, while the pin 16, which projects upwardly out of the recess 33, projects into but does not fill the other half of the space referred to. Preferably therefore, the rib 39 is arranged to project inwardly from the inner surface of the cap, enough to engage the pin 16 and to hold it in the recess during its rotation therein. A similar cap is provided for the reception of the part 30 at the other end of the hinge. It will be seen that when the caps are in place, the pins 15 and 16 are confined in their respective recesses 32 and 33 and cannot be lifted therefrom, whereby the cover 11 is adequately hinged to the container part 13 to rotate with respect thereto when the cover is opened and closed on said container part.

As has been hereinbefore indicated, the part 18 which connects the male member of the hinge to the cover may be so formed as to provide a stop limiting the open position of the cover and adapted to maintain the cover in the limited or predetermined open position thereof. For this purpose, the surface 21 on said connecting part 18 may be so spaced from the surface 19 thereof that when the cover is closed, said surface 21 is upright and on the front side of the axis of the male members of the hinge, but when the cover is open to the desired extent, said surface 21 is on the rear side of said axis and rests against and is stopped by the top rear surface 40 of the female hinge member 12 as is shown by the dash-dot lines of Fig. 2.

Referring to the modification shown in Fig. 4, the rib 39 shown on the inside of the cap of Fig. 3 is in the modification enlarged to provide an inwardly extending portion 41 on the cap 42, said portion 41 filling the space on the inside of the cap above the projecting female part 31. The cap 42 cannot rotate on the rotation of the cover because of the engagement of the surfaces 43 of the portion 41 with the upper flat surfaces 44 of the recessed part 31. The portion 41 also holds the rotatable pin 16 down in the recess 33 of said part 31 in the same general manner as has been previously described in connection with the rib 39. It will therefore be seen that the box parts 11 and 13 may be readily molded, each in one piece with a male or female hinge part, that the box parts may readily be assembled by merely moving the male hinge part downwardly into the recesses of the female hinge part through the open tops thereof, and then capping the ends of the hinge parts by suitable caps to secure the parts together, that when so secured, the box cover may readily be rotated to a definite predetermined open position in which it is self-held, and that there has been provided a simple molded hinge adapted for convenient molding and for commercial use.

Any variation or modification of the invention described above within the spirit thereof is intended to be included in the scope of the appended claims.

I claim:

1. In a molded container, a molded cover, a male hinge member molded integrally with the rear part of the cover and having a central cylindrical portion and end cylindrical portions of lesser diameter than the central portion, a container part having a rear female hinge member molded integrally therewith and provided with a central recess receiving the central cylindrical portion of the male member and with end recessed projections receiving the end reduced cylindrical portions of the male member, and a cap frictionally fitted over each of the end projections of the female member and provided with means for engaging the reduced cylindrical portions of the male member for preventing lifting of said projections on the relative rotation of the cover and the container part.

2. In an integral molded hinge for a two part box, a male member integrally molded with one part, said member having a central cylindrical portion and end cylindrical portions of reduced diameter, a recessed female member on the other box part, said female member having a recessed central portion receiving part of the central cylindrical portion of the male member and having recessed end projections receiving respective parts of the reduced cylindrical portions of the male member, and a hollow cap having a closed end and slidably fitted around the end projections and engaging the reduced cylindrical portions for maintaining the male member in the recesses of the female member during the relative rotation of said members.

3. In a molded hinge for a hinged box, a male member on one part of the box, said member having end portions of lesser diameter than the central portion thereof, a female member fitted to the male member and rotatably engaging half of the surfaces of the male member and serving as a partial bearing therefor, a pair of spaced annular shoulders on the male member at the juncture of the central portion and the end portions of the male member, a pair of corresponding and correspondingly spaced annular shoulders on the female member engaging the respective shoulders of the male member, and cap members fitted over the ends of the female member and engaging the reduced parts of the male member.

4. In a molded hinge, a male member having a central cylindrical surface of one diameter and end cylindrical surfaces of lesser diameter, a female member receiving half of the male member and having free end walls and provided with recesses therein corresponding in diameter to the diameters of those portions of the male member received thereby, and hollow cap members fitted over the respective end portions of the female member and each having an end wall engaging a free end wall of the female member and provided with inwardly projecting means engaging the reduced portions of the male member said cap members preventing all relative movement of said male and female members except rotational movement.

5. In a molded hinge, a male member having a cylindrical central portion of one diameter and cylindrical end portions of lesser diameter, there being a shoulder between said central portion and each of the end portions, a female member having a semi-cylindrical central recess therein fitted to and receiving the central portion of the male member, a wall at each end of the recess engaging a shoulder of the male member and thereby preventing relative longitudinal movement of the male and female members, end projections on the female member each having a recess reduced in diameter and fitted to and receiving a reduced end projection of the male member, and a cap for each of the end projections of the female member slidably fitted to said end projection and having an inwardly projecting part engaging the reduced end projection of the male member and thereby preventing lifting movement of the male member out of its recess.

6. In a molded hinge, a cylindrical male member having projecting end portions each coaxial of the member and each terminating in a free end, a female member recessed to fit and rotatably receive half of the male member and having coaxial projecting end portions each recessed to fit and receive half of a projecting end portion of the male member, a pair of spaced annular shoulders each at the inner end of one of the end portions of the male member, a correspondingly spaced pair of annular shoulders each at the inner end of one of the end portions of the female member, the corresponding shoulders of the respective members being adjacent each other and thereby preventing relative longitudinal movement of the members, and an enclosing member for each pair of corresponding projecting portions of the male and female member.

7. In a molded hinge, a cylindrical male member having projecting end portions each terminating in a free end, a female member recessed to fit and rotatably receive half of the male member and having projecting end portions each recessed to fit and receive half of a projecting end portion of the male member, an enclosing member for each pair of corresponding projecting portions of the male and female member, an annular shoulder at the inner end of each of the end portions of each of said members, corresponding shoulders of the respective members being arranged adjacent each other to engage each other on attempted relative longitudinal movement of said members thereby to prevent such movement, and stop means on the male member adapted to engage the female member to limit the amount of relative rotative movement of said members.

8. In a molded container, a molded cover having a cylindrical male member molded integrally with and projecting from the rear face thereof, end portions on the male member in rearward spaced relation to said rear face, a molded container part, a recessed female member molded integrally with and projecting from the rear face of the container part and rotatably receiving part of the male member, recessed end projections on the female member in rearward spaced relation to the rear face of the container part, and capping members each enclosing an end projection of the female member and the corresponding end projection of the male member and having part thereof arranged in the space between the end projection of the female member and the rear face of the container part.

9. In a molded hinge, a cylindrical male member, a semi-cylindrical female member having a recess therein receiving the male member, said recess being open at its top and being of the same diameter as that of the male member whereby half of the male member may be set into the recess through the open top thereof by a downward movement, a pair of annular shoulders on the male member, a corresponding pair of annular shoulders on the female member respectively engaging the shoulders of the male member and preventing relative longitudinal movement of the members, and means for securing the members together for relative rotary movement and against separating movement thereof comprising a sleeve-like cap over each end part of the female member.

10. In a molded hinge for a two-part molded box, a cylindrical male member molded integrally with and at the rear of one part of the box, the end parts of said member being in rearward spaced relation to said part of the box, a semi-cylindrical female member molded integrally with and at the rear of the other part of the box, the end parts of said female member being in rearward spaced relation to said other part of the box, said female member and its end parts having recesses therein open at the top for the reception respectively of the male member and the end parts thereof, and a sleeve having an inner surface engaging the outer surface of an end part of the female member and also engaging the corresponding end part of the male member, said sleeve having a portion thereof arranged in the space between said end part of the female member and the rear of said other part of the box.

HUNA L. APFELBAUM.